A. T. DAWSON AND G. T. BUCKHAM.
ORDNANCE SIGHTING APPARATUS.
APPLICATION FILED MAR. 24, 1920.
1,364,729. Patented Jan. 4, 1921.
3 SHEETS—SHEET 2.
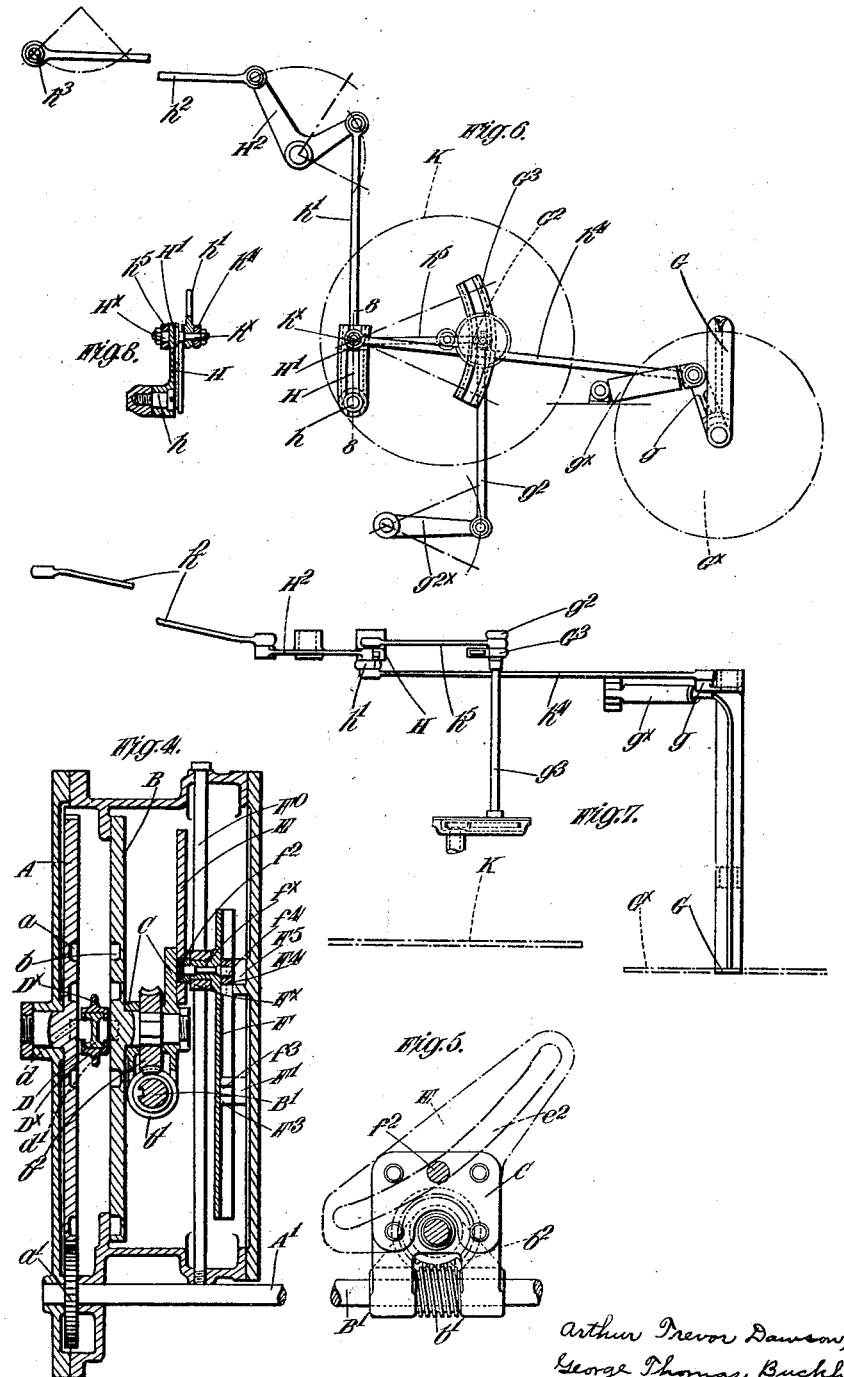

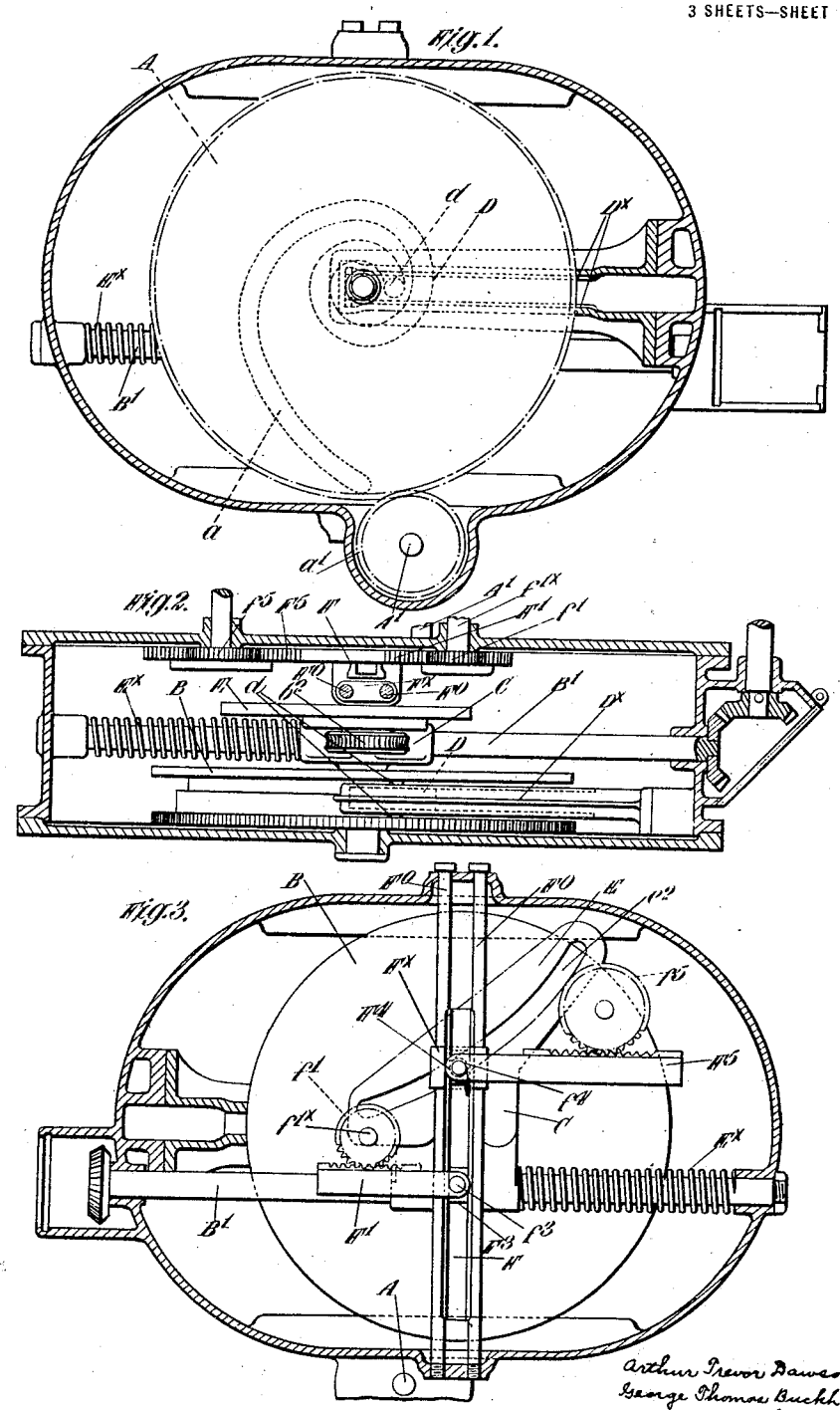

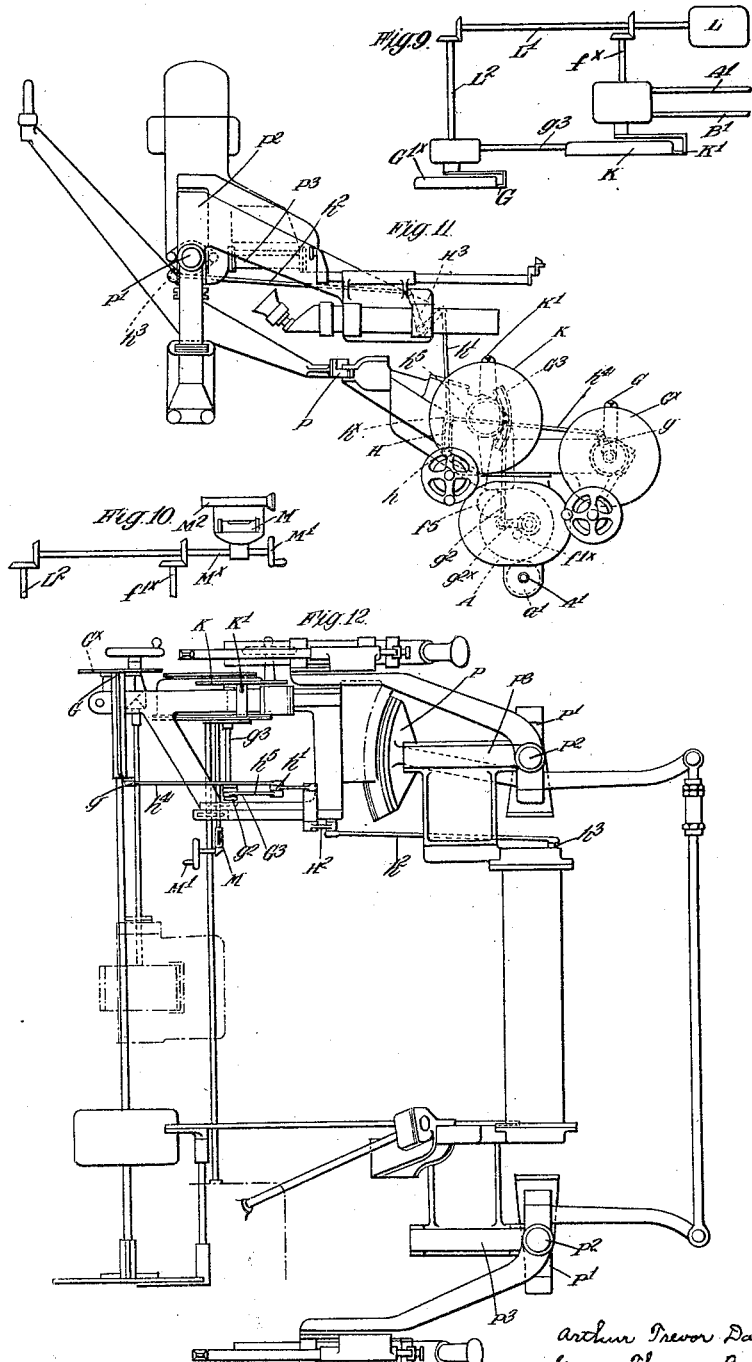

UNITED STATES PATENT OFFICE.

ARTHUR TREVOR DAWSON AND GEORGE THOMAS BUCKHAM, OF WESTMINSTER, LONDON, ENGLAND, ASSIGNORS TO VICKERS LIMITED, OF WESTMINSTER, LONDON, ENGLAND.

ORDNANCE SIGHTING APPARATUS.

1,364,729.   Specification of Letters Patent.   Patented Jan. 4, 1921.

Application filed March 24, 1920. Serial No. 368,457.

*To all whom it may concern:*

Be it known that we, Sir ARTHUR TREVOR DAWSON, bart., and Sir GEORGE THOMAS BUCKHAM, knight, both subjects of the King of Great Britain, residing at Vickers House, Broadway, Westminster, in the county of London, England, have invented certain new and useful Improvements in or Relating to Ordnance Sighting Apparatus, of which the following is a specification.

This invention relates to sighting apparatus for ordnance, particularly anti-aircraft ordnance, mounted on ships and has for its chief object to devise means for compensating for the effect of the rolling movements of the ship on the proper setting of the sight.

According to the invention we provide means which are maintained set in accordance with the angles through which the ship rolls, the quadrant angles of the gun and the angles of sight and thereby operate to enable or cause the angle of horizontal deflection to be varied to compensate for these conditions. These means preferably operate upon the zero mark or pointer appertaining to the horizontal deflection dial so that the pointer is caused to take up different zero positions, with the result that in keeping the desired graduation of the horizontal deflection dial opposite the pointer the required lateral correction will be imparted to the sight.

We furthermore, according to this invention, provide means which are maintained set in accordance with the angles through which the ship rolls, the horizontal deflection angles and the angles of sight and thereby operate to enable or cause the angle of vertical deflection to be varied to compensate for these conditions. These means preferably operate upon the zero mark or pointer appertaining to the vertical deflection dial so that the pointer is caused to take up different zero positions.

In order that the said invention may be more clearly understood and readily carried into effect we will describe the same more fully with reference to the accompanying drawings, in which:—

Figures 1, 2, 3 and 4 are respectively a sectional side elevation, a sectional plan, a sectional side elevation viewed in the opposite direction to Fig. 1, and a vertical transverse section, illustrating a constructional form of the invention as applied to horizontal deflection and Fig. 5 is an elevation of a detail of Figs. 1 to 4 hereinafter referred to, Fig. 6 is a side elevation showing a constructional form of the invention as applied to vertical deflection, Fig. 7 is a plan of Fig. 6, Fig. 8 is a local section taken on the line 8—8 of Fig. 6.

Fig. 9 is a plan showing in a diagrammatic manner a method by which the apparatus can be automatically set in accordance with the angle of roll of the ship, Fig. 10 is a side elevation showing in a diagrammatic manner a method by which the setting of the apparatus in accordance with the angle of roll of the ship can be effected by hand.

Figs. 11 and 12 are respectively a right hand side elevation and a plan of a complete sighting apparatus provided with our improvements.

Referring to Figs. 1 to 4, A is a cam having a cam groove $a$ or other operative surface formed in accordance with the tangents of the angles of sight, this cam being adapted to be angularly displaced from the sight through an angle proportionate to the angle of sight by a shaft $A'$ and a pinion $a'$ meshing with teeth on the periphery of the cam. B is a second cam having a cam groove $b$ or other operative surface formed in accordance with the tangents of the quadrant angles of the gun, this cam being adapted to be angularly displaced through an angle proportionate to the quadrant angle of the gun by a shaft $B'$ and a worm $b'$ meshing with a worm wheel $b^2$ connected to this cam. These two cams are, for the sake of distinction, referred to herein as the angle of sight cam and the gun angle cam respectively, and one of them, preferably the former, is pivoted to a fixed part or casing of the apparatus, while the other is pivoted to a sliding block C or other appropriate member. The worm $b'$ and the worm wheel $b^2$ are carried by the sliding block C and the worm is slidably connected to the shaft $B'$ which by engaging in holes in lugs on the block C (see Fig. 5) serves to slidably support this block. The cams are preferably arranged face to face a short distance apart and in the zero position of their two axes are in alinement. The cam grooves in cams are formed in their adjacent faces and receive rollers or projections $d$, $d$ mounted on a sliding carrier D disposed in guides $D^\times$, $D^\times$. Thus when the angle of sight cam A is angularly displaced, the sliding carrier D receives a movement proportionate to the tangent of the angle of sight and this sliding movement of the carrier causes the gun angle cam B to be shifted bodily from its zero position. When the latter cam is angularly displaced in accordance with the quadrant angle, the cam groove $b$ causes the said cam to move bodily in the reverse direction in accordance with the tangent of the quadrant angle of the gun. The total bodily movement of the gun angle cam B is therefore equal to the difference between the tangent of the angle of sight and the tangent of the quadrant angle of the gun. The sliding block C which moves bodily with the gun angle cam B carries a cam plate E having a slot $e^2$ with which engages a roller $f^2$ carried by a lever F to which, at some distance from the roller, is connected by a pivot pin $f^3$ and a block $F^3$ slidably mounted in the lever F, a rack F' with which gears the pinion $f'$ operated, as will be hereinafter described, in accordance with the angle of roll of the ship. To the said lever is also connected by a block $F^4$ slidably mounted thereon and a pivot pin $f^4$ normally arranged in alinement with the axis of the roller $f^2$, a second rack $F^5$ gearing with a second pinion $f^5$ connected to the horizontal deflection pointer K' of the horizontal deflection dial K (Figs. 9, 11 and 12) by means of suitable gearing. The lever F is pivoted by a spigot $f^\times$ (whose axis is in alinement with the axis of the roller $f^2$) to a block $F^\times$ adapted to slide on fixed guides or rods $F^0$, $F^0$ attached to the casing of the apparatus. In the normal or neutral position of the cam plate E (and consequently of the block $F^\times$), the common axis of the roller $f^2$ and the spigot $f^\times$ is in alinement with the axis of the pivot pin $f^4$ appertaining to the second mentioned rack $F^5$ but when the cam plate receives a bodily movement equal to the difference between the tangent of the angle of sight and the tangent of the quadrant angle of the gun, the slot $e^2$ in this plate operates through the roller $f^2$ to move the lever F bodily relatively to the blocks $F^3$ and $F^4$, the block $F^\times$ sliding on the rods $F^0$, $F^0$ during this movement of the lever. As the said lever receives an angular movement about this spigot proportionate to the angle of roll of the ship, the rack $F^5$ will displace its pinion $f^5$, and therefore the horizontal deflection pointer, through an angle proportionate to the angle of roll multiplied by the difference between the tangent of the angle of sight and the tangent of the quadrant angle of the gun.

The shape of the slot $e^2$ in the cam plate E is determined by calculation for each particular case.

A spring $E^\times$ operating upon the cam plate E may be provided for eliminating backlash between the various coöperating members.

Referring to Figs. 6 to 8, G is the pointer of the vertical deflection dial G. The apparatus shown for varying the position of the pointer comprises a slotted arm or lever H pivoted at $h$ to a fixed part and in the slot is mounted a sliding block H' connected by links $h'$, $h^2$ and a bell crank lever $H^2$, to a pin $h^3$ on the sight bracket so that the block receives a movement toward or away from the pivot $h$ proportionate to the angle of sight. Pivoted at $h^\times$ to this block is a rod $h^4$ connected to an arm $g$ on the pointer G of the vertical deflection dial $G^\times$, a spring contained in a case $g^\times$ being attached to this arm to eliminate back lash between the various coöperating members. Connected to the slotted arm or lever H by a pivot pin $H^\times$ whose axis in the normal or zero position of the sliding block H' is in alinement with the axis of the pivot pin $h^\times$ on this sliding block, is a link $h^5$ also pivoted to a sliding block $G^2$ disposed in a curved guide or quadrant $G^3$ whose center of curvature is normally coincident with the normal or neutral position of the common axis of the aforesaid pivot pins $H^\times$, $h^\times$. This quadrant is rigidly mounted on a spindle $g^3$ connected by suitable gearing to the horizontal deflection dial K or part of the operating mechanism thereof so that the angular position of the quadrant is caused to vary in accordance with the horizontal deflection given to the sight. The sliding block $G^2$ is connected by a link $g^2$ to an arm $g^{2\times}$ which is moved through an angle proportionate to the angle of roll of the ship. The result of this arrangement is that the movement given to the pointer G is determined by the distance of the sliding block H' from the pivot $h$ of the slotted arm or lever H, by the angular position of the quadrant $G^3$ and by the position of the sliding block $G^2$ in regard to this quadrant. In other words the movement given to the pointer varies with the angle of sight, the horizontal deflection setting of the sight and the angle of roll of the ship.

The means for determining the angle of roll of the ship and for imparting movement to the appropriate part of either of the two apparatus hereinbefore described, may comprise as shown by Fig. 9 an electric motor L whose controlling switch is operated by a gyroscope (not shown) so as to cause the motor to revolve one way or the other by an amount proportionate to the angle of roll. This motor drives a shaft L', from which movement is transmitted to the shaft $f'^\times$ of Figs. 1 to 5 and to a shaft $L^2$ operating the arm $g^{2x}$ of Figs. 6 to 8; in this arrangement the adjustment in accordance with the angle of roll is effected automatically. Fig. 10 shows the electric motor L and its controlling gyroscope of Fig. 9 replaced by a clinometer M controlled by a hand wheel $M^1$ and a worm on the shaft $M^x$ meshing with a worm-wheel segment on the rocking part carrying the clinometer, the motion of the shaft $M^x$ being a measure of the roll of the ship; in association with this clinometer and mounted on the said rocking part there may be a telescope $M^2$ as shown which is intended to be kept sighted on the horizon under conditions where the horizon is visible from the gun position; it will be observed that in this arrangement the adjustment in accordance with the angle of roll is effected by hand as distinct from automatically as in Fig. 9.

In Figs. 11 and 12, which show a complete sighting apparatus provided with our improvements, the same reference letters as have been employed in the preceding figures are employed to designate similar parts. The sighting apparatus is of the cross-connected type with an independent line of sight, i. e. the sight is elevated through the pointing gear while tangent elevation and vertical deflection are set direct on the gun, as is set forth in the specification of the prior British Patent No. 129384. Horizontal deflection is set in azimuth through the segment P and a form of Hooke's joint the essential parts of which are marked P', $P^2$, and $P^3$; the segment P, the horizontal deflection hand-wheel and the mechanism interposed between this hand-wheel and the segment are mounted on the carriage.

The apparatus for enabling the angles of horizontal and vertical deflection to be varied as described above instead of operating upon the pointers of the horizontal and vertical deflection dials, may operate upon the adjusting gears of the sight through differential gearing in which case the required variations in the angles of horizontal and vertical deflection would be imparted to the sight by the said apparatus itself.

By the expression "angle of roll" herein used, is meant the angle that the ship rolls from the vertical in the vertical plane containing the axis of the gun trunnions at any angle of training of the gun.

What we claim and desire to secure by Letters Patent of the United States is:—

1. In a sighting apparatus for ordnance mounted on ships, the combination of a sight, means for varying the quadrant angles of the gun, means for varying the angles of sight, and means operatively connected thereto for varying the angle of horizontal deflection in accordance with said quadrant angles, said angles of sight, and the angles through which the ship rolls.

2. In sighting apparatus for ordnance mounted on ships, the combination with the sight, of an element which is maintained set in accordance with the angles through which the ship rolls, a second element which is maintained set in accordance with the quadrant angles of the gun, a third element which is maintained set in accordance with the angles of sight, a fourth element, and mechanism coöperating between said elements whereby said fourth element receives from the setting of the other elements a resultant displacement proportionate to the required variation to be made in the angle of horizontal deflection.

3. In sighting apparatus for ordnance mounted on ships, the combination with the sight, of means which are maintained set in accordance with the angles through which the ship rolls, the quadrant angles of the gun, and the angles of sight and means operatively connected thereto for determining the required variation in the angle of horizontal deflection upon the setting of said first mentioned means.

4. In sighting apparatus for ordnance mounted on ships, the combination with the sight and the horizontal deflection indicator comprising a member movable in accordance with the horizontal deflection given to the sight and a second or index member with respect to which the first-mentioned member moves, of means which are maintained set in accordance with the angles through which the ship rolls, the quadrant angles of the gun and the angles of sight and means whereby the setting of the first-mentioned means causes said index member to be displaced by an amount corresponding to the variation required to be made in the angle of horizontal deflection to compensate for these conditions.

5. In sighting apparatus for ordnance mounted on ships, the combination with the sight and the horizontal deflection indicator comprising a member movable in accordance with the horizontal deflection given to the sight and a second or index member with respect to which the first-mentioned member moves, of an element which is maintained set in accordance with the angles through which the ship rolls, a second element which is maintained set in accordance with the quardant angles of the gun, a third element which is maintained set in accordance with the angles of sight, a fourth element, mechanism coöperating between said elements whereby said fourth element receives from the setting of the other elements a resultant displacement proportionate to the required variation to be given to the angle of horizontal deflection of the sight and means for causing the displacement of said fourth element to vary the position of said index member.

6. In sighting apparatus for ordnance mounted on ships, the combination with the sight, of means which are maintained set in accordance with the angles through which the ship rolls, the quadrant angles of the gun and the angles of sight and means whereby the setting of the first-mentioned means causes the angle of horizontal deflection to be varied to compensate for these conditions.

7. In sighting apparatus, for ordnance mounted on ships, the combination with the sight and its horizontal deflection gear, of an element which is maintained set in accordance with the angles through which the ship rolls, a second element which is maintained set in accordance with the quadrant angles of the gun, a third element which is maintained set in accordance with the angles of sight, a fourth element, mechanism coöperating between said elements whereby said fourth element receives from the setting of the other elements a resultant displacement proportionate to the required variation to be given to the angle of horizontal deflection of the sight and means whereby said fourth element operates upon the horizontal deflection gear of the sight.

8. In sighting apparatus for ordnance mounted on ships, the combination of a sight, means for varying the horizontal deflection angles, means for varying the angles of sight, and means operatively connected thereto for varying the angles of vertical deflection in accordance with said horizontal deflection angles, said angles of sight, and the angles through which the ship rolls.

9. In sighting apparatus for ordnance mounted on ships, the combination with the sight, of an element which is maintained set in accordance with the angles through which the ship rolls, a second element which is maintained set in accordance with the horizontal deflection angles, a third element which is maintained set in accordance with the angles of sight, a fourth element, and mechanism coöperating between said elements whereby said fourth element receives from the setting of the other elements a resultant displacement proportionate to the required variation to be made in the angle of vertical deflection.

10. In sighting apparatus for ordnance mounted on ships, the combination with the sight, of means which are maintained set in accordance with the angles through which the ship rolls, the horizontal deflection angles and the angles of sight, and means operatively connected thereto for determining the required variation in the angle of vertical deflection upon the setting of said first mentioned means.

11. In sighting apparatus for ordnance mounted on ships, the combination with the sight and the vertical deflection indicator comprising a member movable in accordance with the vertical deflection given to the sight and a second or index member with respect to which the first-mentioned member moves, of means which are maintained set in accordance with the angles through which the ship rolls, the horizontal deflection angles and the angles of sight and means whereby the setting of the first-mentioned means causes said index member to be displaced by an amount corresponding to the variation required to be made in the angle of vertical deflection to compensate for these conditions.

12. In sighting apparatus for ordnance mounted on ships, the combination with the sight and the vertical deflection indicator comprising a member movable in accordance with the vertical deflection given to the sight and a second or index member with respect to which the first-mentioned member moves, of an element which is maintained set in accordance with the angles through which the ship rolls, a second element which is maintained set in accordance with the horizontal deflection angles of the gun, a third element which is maintained set in accordance with the angles of sight, a fourth element, mechanism coöperating between said elements whereby said fourth element receives from the setting of the other elements a resultant displacement proportionate to the required variation to be given to the angle of vertical deflection of the sight and means for causing the displacement of said fourth element to vary the position of said index member.

13. In sighting apparatus for ordnance mounted on ships, the combination with the sight, of means which are maintained set in accordance with the angles through which the ship rolls, the horizontal deflection angles and the angles of sight and means whereby the setting of the first-mentioned means causes the angle of vertical deflection of the sight to be varied to compensate for these conditions.

14. In sighting apparatus for ordnance mounted on ships, the combination with the sight and its vertical deflection gear, of an element which is maintained set in accordance with the angles through which the ship rolls, a second element which is maintained set in accordnace with the horizontal deflection angles, a third element which is maintained set in accordance with the angles of sight, a fourth element, mechanism coöperating between said elements whereby said fourth element receives from the setting of the other elements a resultant displacement proportionate to the required variation to be given to the angle of vertical deflection of the sight, and means whereby said fourth element operates upon the vertical deflection gear of the sight.

15. In sighting apparatus for ordnance mounted on ships, the combination with the sight, of means whereby the angle of horizontal deflection is varied in accordance with the angles through which the ship rolls, the quadrant angles of the gun and the angles of sight, and means operatively connected thereto whereby the angle of vertical deflection is varied in accordance with the angles through which the ship rolls, the horizontal deflection angles and the angles of sight.

16. In sighting apparatus for ordnance mounted on ships, the combination with the sight, the horizontal deflection indicator comprising a member movable in accordance with the horizontal deflection given to the sight and a second or index member with respect to which the first-mentioned member moves, the vertical deflection indicator comprising a member movable in accordance with the vertical deflection given to the sight and an index member with respect to which this movable member moves, of apparatus comprising an element which is maintained set in accordance with the angles through which the ship rolls, a second element which is maintained set in accordance with the quadrant angles of the gun, a third element which is maintained set in accordance with the angles of sight, a fourth element and mechanism coöperating between said elements whereby said fourth element receives from the setting of the other elements a resultant displacement proportionate to the required variation to be given to the angle of horizontal deflection of the sight, means for causing the displacement of said fourth element to vary the position of the index member of the horizontal deflection indicator, apparatus comprising an element which is maintained set in accordance with the angles through which the ship rolls, a second element which is maintained set in accordance with the horizontal deflection angles, a third element which is maintained set in accordance with the angles of sight, a fourth element and mechanism coöperating between said elements whereby the last-mentioned element receives from the setting of the other elements associated with it a resultant displacement proportionate to the required variation to be given to the angle of vertical deflection of the sight and means for causing the displacement of the second mentioned fourth element to vary the position of the index member of the vertical deflection indicator.

In testimony whereof we affix our signatures.

ARTHUR TREVOR DAWSON.
GEORGE THOMAS BUCKHAM.